United States Patent
Mohseni et al.

(10) Patent No.: US 10,690,201 B2
(45) Date of Patent: Jun. 23, 2020

(54) ADDITIVELY-MANUFACTURED BRAKE PAD ASSEMBLY WITH CONTROLLED COMPRESSIBILITY FACTOR

(71) Applicants: Robert Bosch LLC, Broadview, IL (US); Robert Bosch GmbH, Stuttgart (DE)

(72) Inventors: Hamidreza Mohseni, Naperville, IL (US); Mark Phipps, Wayne, IL (US)

(73) Assignees: Robert Bosch LLC, Broadview, IL (US); Robert Bosch GmbH, Stuttgart (DE)

(*) Notice: Subject to any disclaimer, the term of this patent is extended or adjusted under 35 U.S.C. 154(b) by 13 days.

(21) Appl. No.: 16/145,980

(22) Filed: Sep. 28, 2018

(65) Prior Publication Data

US 2019/0101173 A1 Apr. 4, 2019

Related U.S. Application Data

(60) Provisional application No. 62/565,413, filed on Sep. 29, 2017.

(51) Int. Cl.
*F16D 69/02* (2006.01)
*F16D 65/09* (2006.01)
(Continued)

(52) U.S. Cl.
CPC .......... *F16D 65/092* (2013.01); *B22F 3/1055* (2013.01); *B22F 7/08* (2013.01); *B33Y 10/00* (2014.12); *B33Y 80/00* (2014.12); *F16D 66/00* (2013.01); *F16D 66/021* (2013.01); *F16D 69/02* (2013.01); *B22F 2005/004* (2013.01); *B22F 2005/005* (2013.01); *B23K 9/04* (2013.01); *B23K 26/342* (2015.10); *F16D 66/028* (2013.01); *F16D 2066/001* (2013.01);
(Continued)

(58) Field of Classification Search
CPC ....... F16D 2069/002; F16D 2200/0004; F16D 2200/0034; F16D 2200/0039; F16D 2200/0082; F16D 2200/0091
USPC ........................................ 188/251 A, 251 M
See application file for complete search history.

(56) References Cited

U.S. PATENT DOCUMENTS 2,599,826 A * 6/1952 Halstead ............... F16D 69/021
138/174
3,673,058 A 6/1972 Jackson et al.
(Continued)

FOREIGN PATENT DOCUMENTS

JP H09296835 9/2012

OTHER PUBLICATIONS

Cheung et al, "Reversibly Assembled Cellular Composite Materials", Science, vol. 341, Sep. 13, 2013; pp. 1219-1222.
(Continued)

*Primary Examiner* — Thomas J Williams
*Assistant Examiner* — James K Hsiao
(74) *Attorney, Agent, or Firm* — David Kovacek; Maginot, Moore & Beck LLP (57) ABSTRACT

A brake pad assembly having a consolidated lining comprised of an enhancement framework disposed within a tribological lining, the enhancement framework and tribological lining having substantially the same compressibility factor. The enhancement framework or tribological lining may advantageously be manufactured using an additive manufacturing technique.

19 Claims, 5 Drawing Sheets

(51) Int. Cl.
| | |
|---|---|
| *F16D 65/092* | (2006.01) |
| *B33Y 10/00* | (2015.01) |
| *F16D 66/02* | (2006.01) |
| *B33Y 80/00* | (2015.01) |
| *B22F 3/105* | (2006.01) |
| *F16D 66/00* | (2006.01) |
| *B22F 7/08* | (2006.01) |
| *F16D 69/00* | (2006.01) |
| *B22F 5/00* | (2006.01) |
| *B23K 9/04* | (2006.01) |
| *B23K 26/342* | (2014.01) |

(52) U.S. Cl.
CPC ............... *F16D 2069/002* (2013.01); *F16D 2200/0004* (2013.01); *F16D 2200/006* (2013.01); *F16D 2200/0034* (2013.01); *F16D 2200/0039* (2013.01); *F16D 2200/0052* (2013.01); *F16D 2250/00* (2013.01); *F16D 2250/0007* (2013.01); *F16D 2250/0061* (2013.01); *F16D 2250/0069* (2013.01)

(56) References Cited

U.S. PATENT DOCUMENTS

| | | | | |
|---|---|---|---|---|
| 3,948,346 | A | | 4/1976 | Schindler |
| 4,278,153 | A | * | 7/1981 | Venkatu ................ F16D 65/122 188/251 M |
| 4,728,552 | A | * | 3/1988 | Jensen, Jr. ............. B24B 37/24 101/376 |
| 4,997,067 | A | * | 3/1991 | Watts ...................... F16D 49/00 188/250 B |
| 5,083,643 | A | * | 1/1992 | Hummel .................. C08L 9/02 188/251 A |
| 5,861,203 | A | * | 1/1999 | Yuan ..................... B29C 43/006 428/117 |
| 5,909,171 | A | * | 6/1999 | Kyrtsos ................... F16D 66/00 116/208 |
| 6,355,206 | B1 | * | 3/2002 | Hanzawa .............. C04B 35/573 266/239 |
| 6,521,344 | B1 | * | 2/2003 | Hanzawa .............. C04B 35/573 428/368 |
| 7,871,578 | B2 | * | 1/2011 | Schmidt ............... B01J 19/0093 422/198 |
| 8,603,614 | B2 | * | 12/2013 | Lam ....................... B82Y 30/00 428/195.1 |
| 9,657,798 | B2 | * | 5/2017 | Lam ...................... F16D 69/026 |
| 2001/0051258 | A1 | * | 12/2001 | Hanzawa .............. C04B 35/573 428/293.4 |
| 2002/0006506 | A1 | * | 1/2002 | Hanzawa .............. C04B 35/573 428/293.1 |
| 2004/0130046 | A1 | * | 7/2004 | Sommer ................. B32B 18/00 264/29.7 |
| 2005/0025951 | A1 | * | 2/2005 | Gruber .................... C04B 35/83 428/299.1 |
| 2006/0008635 | A1 | * | 1/2006 | Dong .................... F16D 69/026 428/304.4 |
| 2006/0175162 | A1 | * | 8/2006 | Thorp ..................... F16D 69/00 188/251 M |
| 2008/0176470 | A1 | * | 7/2008 | Filip ..................... B32B 27/281 442/101 |
| 2012/0085605 | A1 | * | 4/2012 | Abe ...................... F16D 69/025 188/251 A |
| 2012/0228069 | A1 | | 9/2012 | Kulis, Jr. et al. |
| 2013/0284548 | A1 | * | 10/2013 | Guether ................. B32B 18/00 188/218 XL |
| 2015/0053517 | A1 | * | 2/2015 | Arbesman ........... F16D 69/0408 188/251 A |
| 2015/0292582 | A1 | * | 10/2015 | El-Wardany ............. B66B 5/22 188/250 G |
| 2015/0308532 | A1 | * | 10/2015 | Kobune ................ F16D 69/026 188/251 A |
| 2015/0367592 | A1 | * | 12/2015 | Martinez, III ........... B32B 1/08 428/34.1 |
| 2016/0138213 | A1 | * | 5/2016 | Bortz .................... D06M 15/59 428/93 |
| 2016/0223042 | A1 | * | 8/2016 | Iwai ..................... F16D 69/027 |
| 2016/0332416 | A1 | * | 11/2016 | Troester ................... B32B 5/02 |
| 2017/0001373 | A1 | * | 1/2017 | La Forest ........... C04B 38/0032 |
| 2017/0126087 | A1 | * | 5/2017 | Soderberg ............ H02K 21/042 |
| 2017/0151712 | A1 | * | 6/2017 | La Forest ............. B29C 64/386 |
| 2017/0175834 | A1 | * | 6/2017 | Bracamonte ........... B32B 15/01 |
| 2017/0328429 | A1 | * | 11/2017 | Valle .................... F16D 65/125 |
| 2018/0142746 | A1 | * | 5/2018 | Hodgkins ............. B22F 3/1055 |
| 2018/0209497 | A1 | * | 7/2018 | Cividini ................ F16D 65/125 |

OTHER PUBLICATIONS

Quan et al, "Microstructural design and additive manufacturing and characterization of 3D orthogonal short carbon fiber/acrylonitrile-butadiene-styrene preform and composite", Composites Science and Technology, vol. 126, 2016; pp. 139-148.

Quan et al, "Additive manufacturing of multidirectional preforms for composites: opportunities and challenges". Materials Today, vol. 18, No. 9, Nov. 2015; pp. 503-512.

Oluwaseyi Sosanya's 3D Weaving Machine—YouTube; https://www.youtube.com/watch?V=rhRCtXciociA.

* cited by examiner

ADDITIVELY-MANUFACTURED BRAKE PAD ASSEMBLY WITH CONTROLLED COMPRESSIBILITY FACTOR

TECHNICAL FIELD

This disclosure relates to the design and manufacture of brake pads for use in a motorized vehicle.

BACKGROUND

Vehicle brake pads are required to provide a particular coefficient of friction for proper operation in order to slow or stop a moving vehicle. Brake pads are comprised of a sacrificial friction lining to act as tribological surface that provides the appropriate coefficient of friction. Thus, by design, brake pads comprise expendable elements that will require replacement over time. It is therefore desirable to improve the expected lifespan of a brake pad by improving the wear resistance of the tribological surfaces thereof.
Friction lining is often an engineered tribological composite made up of several constituents such as binders, fillers, friction modifiers, solid lubricants, etc. that are mixed together. Some designs may be improved using a reinforcement structure disposed within the friction lining, which can improve noise reduction and wear resistance compared to a friction lining which does not have a reinforcement structure. To optimize the brake pad's utility, the coefficient of friction should be substantially consistent across the entire tribological surface of the friction lining. Thus, it is desirable to design a reinforcement structure within the friction lining that has a coefficient of friction and compressibility factor that is substantially equal to that of the tribological composite forming the remaining portions of the brake pad in order to improve wear resistance and noise reduction during operation.

SUMMARY

One aspect of this disclosure is directed to a brake pad assembly having a base plate, a tribological lining extending from the base plate, and an enhancement framework disposed within and dispersed throughout the tribological lining. The enhancement framework provides reinforcement to the tribological lining, and is designed such that its compressibility is substantially factor equal to that of the tribological lining, such that both the tribological lining and enhancement structure at the tribological surface of the brake pad act in coordination in the manner of a single component.

Another aspect of this disclosure is directed to a brake pad assembly comprising a base plate, an enhancement framework extending from the base plate, and a tribological lining infiltrating the enhancement framework. The enhancement framework provides reinforcement to the tribological lining and is comprised of interlaced lattice structures. In some such embodiments, the interlaced lattice structures may be manufactured using an additive manufacturing technique.

A further aspect of this disclosure is directed to a method of manufacturing brake pad assembly. The method comprises assembling of a consolidated lining comprised of an additively-manufactured enhancement framework infiltrated by a tribological lining. After assembly, the consolidated lining is bound to a backing plate and cured to create a brake pad assembly.

According to yet another aspect of the disclosure, the assembly of the enhancement structure may comprise a particular additive manufacturing technique.

According to other optional aspects of this disclosure, a brake pad assembly may comprise additional sensors disposed within an enhancement framework during the assembling of the enhancement framework, and in particular during assembly by an additive manufacturing process.

The above aspects of this disclosure and other aspects will be explained in greater detail below with reference to the attached drawings.

BRIEF DESCRIPTION OF THE DRAWINGS

FIG. 1b is an isometric view of the brake pad assembly depicted in FIG. 1a.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1A:
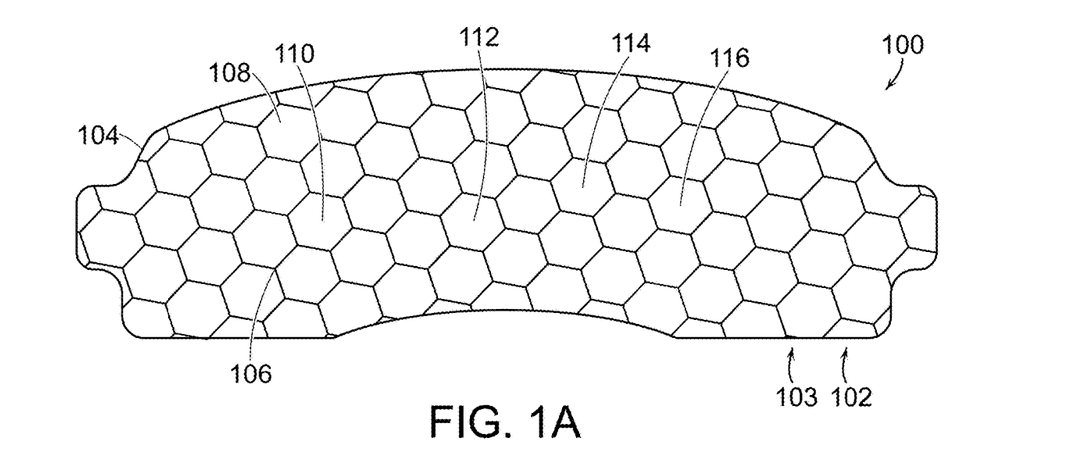
FIG. 1a is a top-down view of a brake pad assembly according to an embodiment of the teachings herein.
Figure 1B:
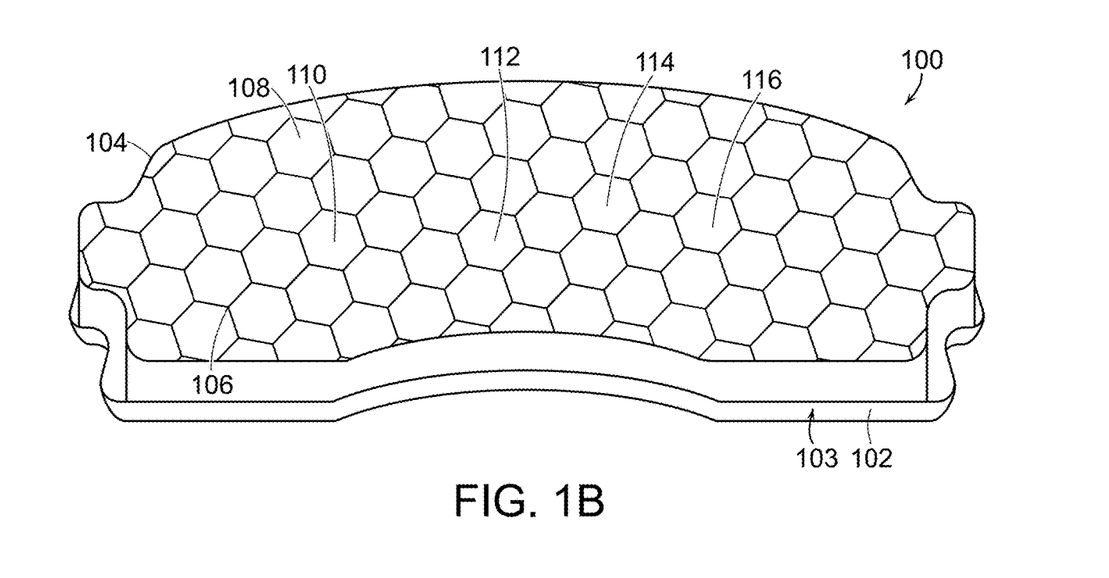

FIG. 1a shows a top-down view of a brake pad assembly 100 according to an embodiment disclosed herein. FIG. 1b shows an isometric view of the brake pad assembly 100 of FIG. 1a. Brake pad assembly 100 comprises a base plate 102 having a surface 103 which supports the rest of the assembly. Extending from the surface 103 of base plate 102 is a consolidated lining 104, comprising of an enhancement framework 106 disposed within a tribological lining 108. The enhancement framework 106 provides support to the consolidated lining 104, improving the durability of the brake pad assembly. In order to optimize durability of the consolidated lining 104, enhancement framework 106 is compressible, having a compressibility factor according to a specification of the vehicle with which brake pad assembly 100 will be implemented. The configuration and material composition of the enhancement framework 106 are highly-correlated to the compressibility factor of enhancement framework 106, and it may be designed to be within the specification required of a brake pad according to the requirements of the associated vehicle. In the depicted embodiment, the repeating geometric enhancement framework 106 is comprised of a number of spring-like structures to achieve the desired compressibility. The material composition of enhancement framework 106 may include metals, metallic alloys, phenolic resin, friction modifiers, solid lubricants, fused polymers, ceramic particles, or any composite or combination of such constituent materials known to one of ordinary skill in the art. In the depicted embodiment, enhancement framework 106 comprises an aluminum alloy arranged in a honeycomb structure, but other embodiments may comprise other material compositions or other arrangements without deviating from the teachings herein. Further discussion regarding the composition and configuration of enhancement framework 106 will later be presented with respect to other drawings.

The tribological lining 108 of brake pad assembly 100 comprises a material infiltrating the enhancement framework 106 and having a coefficient of friction determined by the specification of the vehicle with which the brake pad assembly 100 will be implemented. The material composition of tribological lining 108 dictates both the coefficient of friction and the compressibility factor of the tribological lining 108. Tribological lining 108 may be fabricated using constituent materials such as binders, fillers, friction modifiers, solid lubricants, fused polymers, metals, metallic alloys, ceramic particles, phenolic resin or any combination of such constituent materials known to one of ordinary skill in the art. In the depicted embodiment, tribological lining 108 has infiltrated a large section of enhancement framework 106, and an appropriate portion of the combined materials has been cut into the proper size and shape to form the consolidated lining 104 of the brake pad assembly 100.

Advantageously, the durability of brake pad assembly 100 is optimized when the compressibility factors of enhancement framework 106 and tribological lining 108 are substantially equal. Within the disclosure herein, the compressibility factor of enhancement framework 106 and tribological lining 108 may be considered substantially equal if they are both within the specified values required by the vehicle with which the brake pad assembly 100 will be implemented. In one embodiment, the compressibility factor of enhancement framework 106 and the compressibility factor of tribological lining 108 may each be within 5% of the specified compressibility factor to be considered substantially equal. Other embodiments may comprise other specified tolerances without deviating from the teachings herein.

A number of sensors may be disposed within consolidated lining 104. In the depicted embodiment, these sensors comprise a wear sensor 110, a temperature sensor 112, a pressure sensor 114, and a vibration sensor 116, but other embodiments may comprise other sensor arrangements, including arrangements comprising multiple sensors of the same type. Wear sensor 110 is operable to provide a signal relating the mechanical wear of the brake pad assembly 100, including mechanical wear caused by frictional forces experienced during normal operation of the brakes. Temperature sensor 112 is operable to provide a signal relating the current temperature of the tribological surface of the brake pad assembly 100, including the tribological surface of the consolidated lining 104. Pressure sensor 114 is operable to provide a signal relating the pressing forces applied to brake pad assembly 100, such as compression forces during active normal brake function. Vibration sensor 116 is operable to provide a signal relating the degree of vibration experienced by the brake pad assembly 100, including during normal operation of the brakes. The signals provided by a sensor may take the form of a visual indication, an audible sound, a wired electromagnetic transmission, a wireless electromagnetic transmission, or any other form of signal known to one of ordinary skill in the art without deviating from the teachings herein. Some embodiments may comprise an array of sensors providing signals of the same type. Some embodiments may comprise an array of sensors providing signals of different types. Some embodiments may comprise sensors that provide a plurality of signal types (e.g., a wear sensor 110 operable to provide both a visual indication and also a wireless electromagnetic transmission to relate the mechanical wear of the tribological surface of consolidated lining 104). Some embodiments may comprise a plurality of sensors providing signals of different types directed to the same measurements (e.g., an array of 2 wear sensors 110, with one of the wear sensors providing a visual indication and the other providing a wireless electromagnetic transmission).

The embodiment depicted in FIG. 1*a*, 1*b* comprises a consolidated lining 104 that comprises an enhancement framework 106 arranged as a repeating honeycomb structure, but other embodiments may comprise other arrangements of an enhancement framework 106. Advantageously, a honeycomb structure may be used to control acoustic noise and vibrations of the brake pad assembly 100 during normal operation. An enhancement framework 104 configured to have repeating geometric structures may advantageously improve the cost efficiency of manufacturing the consolidated lining 104. In the depicted embodiment, a large manufacture comprising enhancement framework 106 infiltrated by tribological lining 108 is assembled, and consolidated lining 104 is cut from the large manufacture in the appropriate size and shape to be matched with backing plate 102. The regular repeating geometric form of enhancement framework 106 permits consolidated lining 104 to be cut from any portion of the large manufacture and still retain the desired characteristics matching the specification for brake pad assembly 100. The regular repeating geometric form of enhancement framework 106 is additionally advantageous to create a consolidated lining 104 that has consistent characteristics—including coefficient of friction and compressibility factor—across the entire tribological surface of brake pad assembly 100. In one embodiment, the consolidated lining 104 provides consistent characteristics across the tribologocial surface of brake pad assembly 100 such that the repeating geometric form of enhancement framework 106 is geometrically repeating within any arbitrary plane parallel to base plate 102. Thus in this embodiment, as the tribological surface of brake pad assembly 100 is worn away during normal operation of the brake pad assembly, the brake pad assembly 100 maintains substantially similar characteristics, including coefficient of friction and compressibility factor, across the entire tribological surface thereof as the consolidated lining 104 wears.

In the depicted embodiment, consolidated lining 104 comprises a tribological lining 108 that is comprised of a homogenously-mixed material, though other materials may be used without deviating from the teachings herein. A homogeneously-mixed material is advantageous because it has consistent properties throughout the material, resulting in a lining that has uniform characteristics. While singular materials provide a naturally-homogenous mixture, composite materials having a plurality of component materials may also be homogenously-mixed to a uniform consistency of properties to yield the same advantages. A substantially homogenous-mixture composite will be of a consistency to provide sufficient uniformity that all points of the tribological lining 108 will be within the specified characteristics for brake pad assembly 100.

Figure 2:
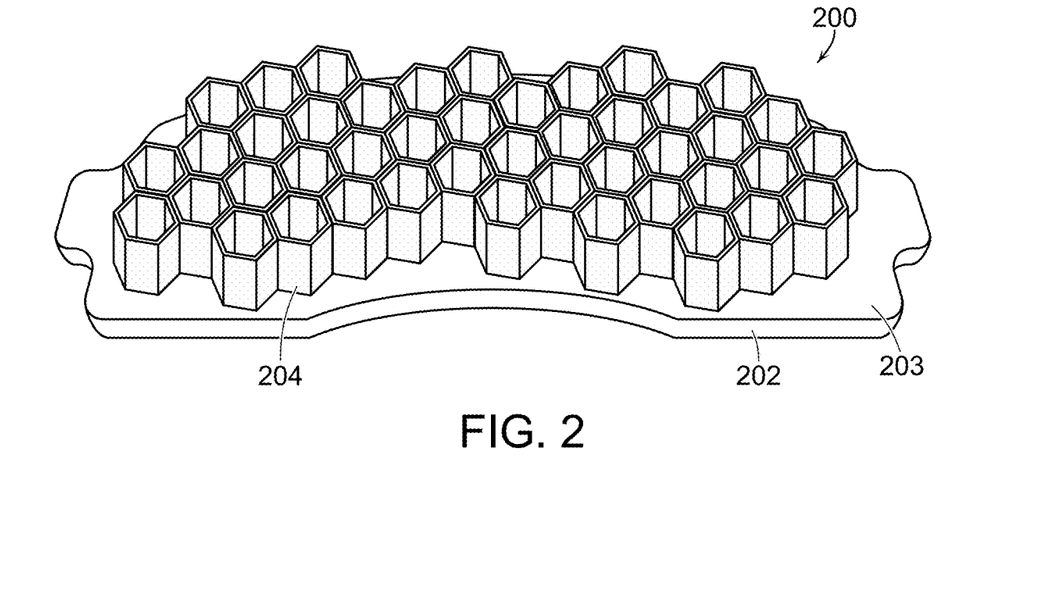
FIG. 2 is an isometric view of an enhancement framework of a brake pad assembly comprising an interlocking honeycomb arrangement.

However, other forms of manufacturing brake pad assembly 100 may be preferred in embodiments having different specified requirements for coefficient of friction, compressibility factor, or other design factors to be considered in the manufacture of a brake pad assembly. FIG. 2 depicts an incomplete brake pad assembly 200, the manufacture thereof performed by directly adding brake pad components to a base plate 202. In the depicted phase of manufacture, an enhancement framework 204 has been assembled in a geometrically-repeating pattern of interlocking honeycomb lattices directly coupled to a surface 203 of base plate 202, but the enhancement framework 204 has not yet been infiltrated by a tribological lining. In some embodiments, enhancement framework 204 is constructed using a casting or molding process. In some embodiments, enhancement framework 204 is constructed using an additive manufacturing technique. In the depicted embodiment, enhancement framework 204 comprises an interlocking honeycomb arrangement, but other embodiments may comprise other arrangements.

Figure 3:
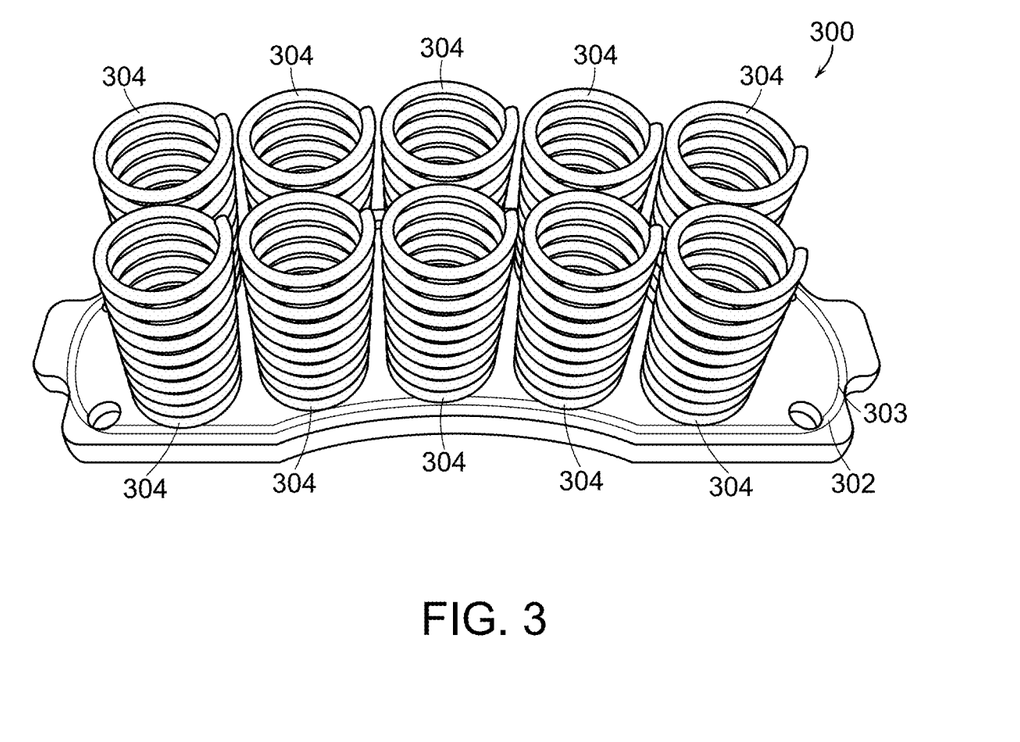
FIG. 3 is an isometric view of an enhancement framework of a brake pad assembly having an arrangement comprised of a series of spring-like coils.

FIG. 3 depicts one such arrangement in the form of an incomplete brake pad assembly 300 having a base plate 302 with a surface 303 which provides the support for the assembly of an enhancement framework comprised of distinct lattice elements 304. Lattice elements 304 form a framework that functions to support a tribological lining similar to the enhancement framework 204 of FIG. 2. Lattice elements 304 may similarly be designed to provide a specified coefficient of friction and compressibility factor, in the same manner as the interlocking design of enhancement framework 204. In the depicted embodiment, lattice elements 304 comprise coil-shaped lattices. A coil-shaped lattice is advantageous because it provides a simple control over the compressibility factor of each lattice element 304, in the form of a spring constant. The coil-shaped lattice elements 304 may be designed to have a particular compressibility factor equivalent to other designs (such as enhancement framework 204), or may have a different compressibility required by the specification of the vehicle with which the brake pad assembly will be implemented. In some embodiments, lattice elements 304 are constructed using a casting or molding process. In some embodiments, lattice elements 304 are constructed using an additive manufacturing technique. It is noted that although FIG. 3 is directed to a geometrically-repeating arrangement of the lattice elements 304, lattice elements 304 are not interlocking structures, in contrast to the enhancement framework 204 of FIG. 2.

As depicted in each of FIG. 2 and FIG. 3, the enhancement framework is manufactured completely prior to infiltration with a tribological lining to form a consolidated lining, and thus in each of FIG. 2 and FIG. 3 the enhancement framework is a preform enhancement framework. In some embodiments, the enhancement framework of a brake pad assembly may be manufactured substantially concurrently with the tribological lining.

Utilization of additive manufacturing techniques advantageously permit substantially concurrent manufacturing of the consolidated lining, and also permit construction of arrangements that may be prohibitively expensive or impractical to create using other manufacturing techniques. A consolidated lining of a brake pad assembly or its components may be manufactured using additive manufacturing techniques such as direct metal laser sintering, direct metal laser melting, selective laser sintering, selective laser melting, laser engineered net-shaping, electron beam melting, selective heat sintering, fused deposition modeling, wire-arc additive manufacturing, 3-dimensional weaving, or any other method known to one of ordinary skill in the art.

Figure 4A:
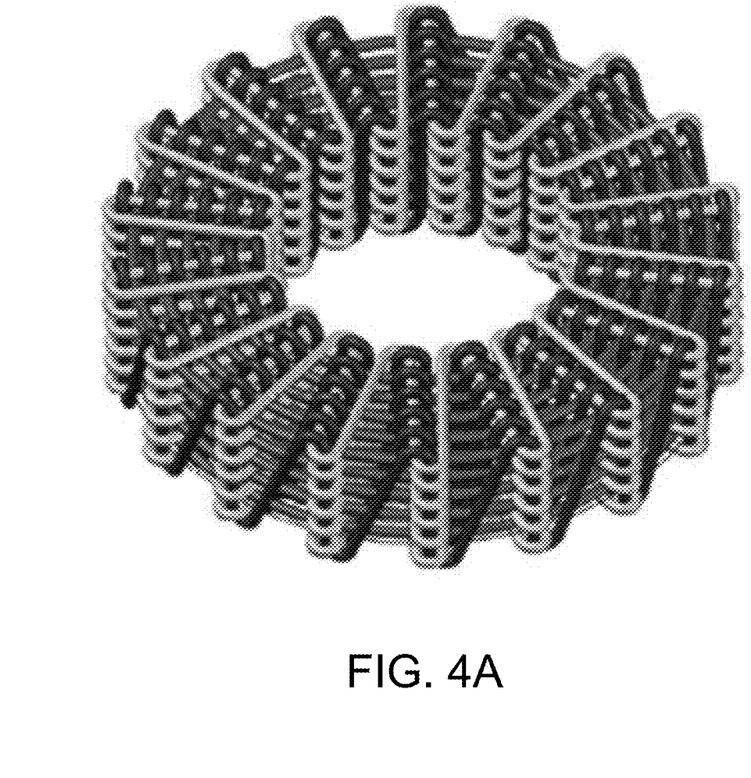
FIG. 4a-4d show alternative embodiments of spring-like structures contemplated for use in an enhancement structure of a brake pad assembly.
Figure 4B:
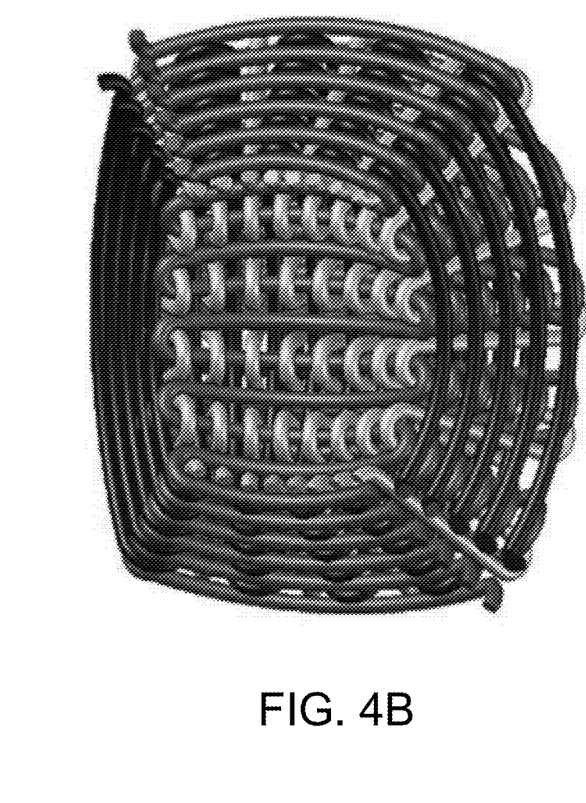
Figure 4C:
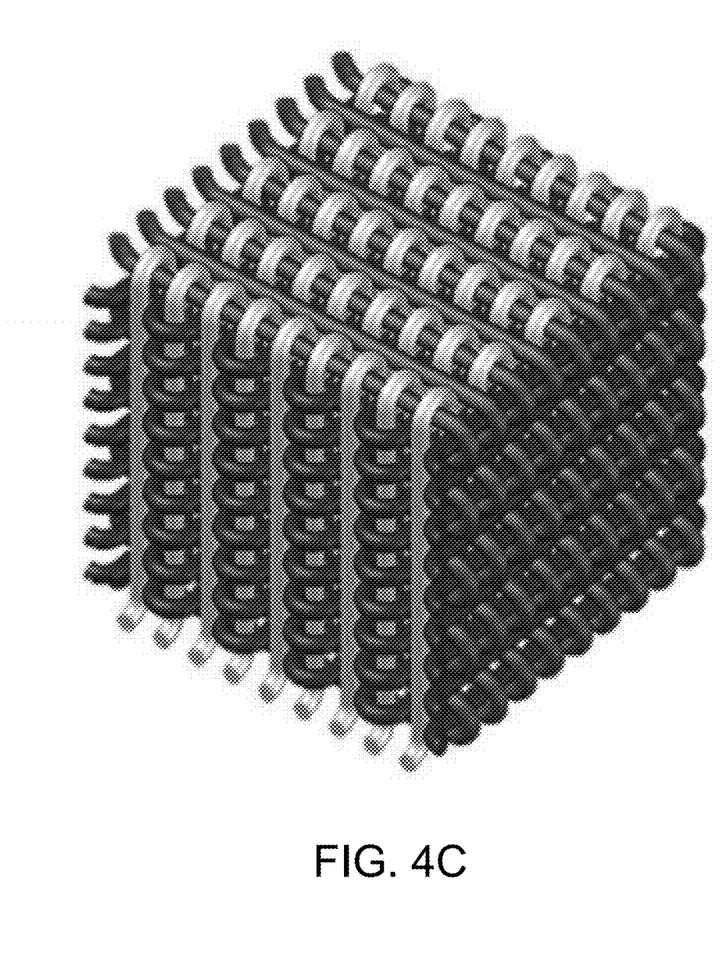
Figure 4D:
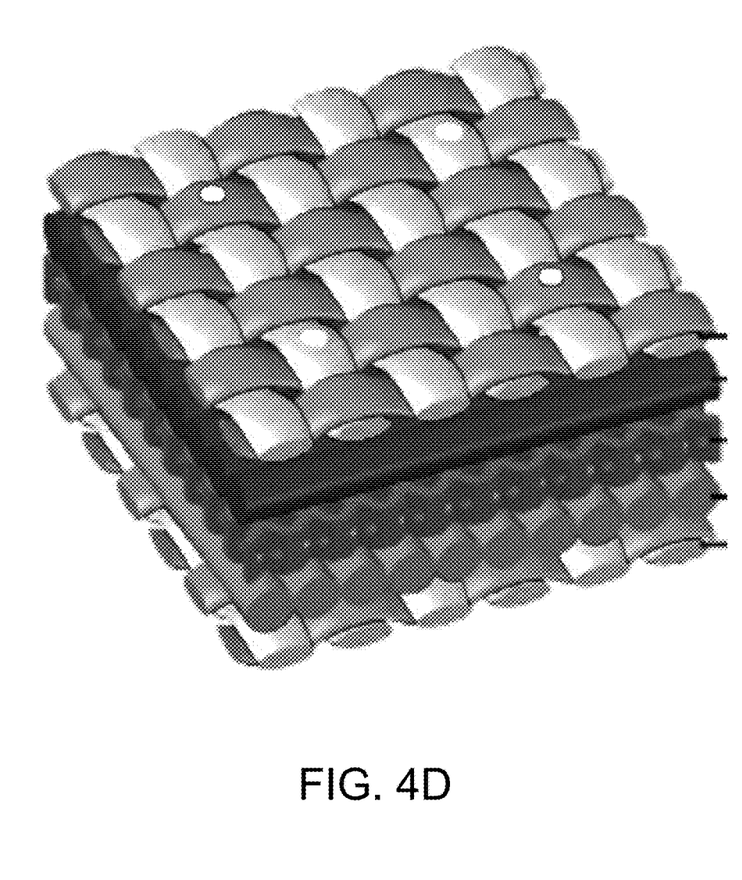

Some embodiments may comprise an enhancement framework comprising lattice elements exhibiting compressibility based upon a 3-dimensional arrangement, resulting in a spring-like structure having 3-dimensional compressibility. FIG. 4a provides an illustration of a lattice element manufactured using an additive manufacturing process based upon a cylindrical-coordinate design. FIG. 4b provides an illustration of a lattice element manufactured using an additive manufacturing process based upon a spherical-coordinate design. FIG. 4c provides an illustration of a lattice element manufactured using an additive manufacturing process based upon a Cartesian-coordinate design. Some embodiments may comprise an enhancement framework comprising lattice structures exhibiting compressibility based upon substantially 2-dimensional arrangements. FIG. 4d provides an illustration of a lattice element manufactured utilizing a "sandwich" method of stacking substantially 2-dimensional interlace layers. Some embodiments may comprise an enhancement framework comprising lattice structures having only substantially 2-dimensional lattices.

FIG. 4a-4d provide examples of lattice elements that comprise interlaced lattice structures. Interlaced lattice structure forms are particularly well-suited to additive manufacturing techniques, as they may be impractical or impossible to construct using other techniques. Variations of the lattice elements depicted in FIG. 4a-4d, and also other interlaced lattice arrangements, are disclosed in "Microstructrual design and additive manufacturing and characterization of 3D orthogonal short carbon fiber/acrylonitrile-butadiene-styrene preform and composite" (Quan et al.; Composites Science and Technology: Vol 26, pp. 139-148), and "Additive manufacturing of multi-directional preforms for composites: opportunities and challenges" (Quan et al.; Materials Today: Vol 18, pp. 503-512). In some embodiments, the interlaced lattice arrangements may be utilized in an enhancement framework having an interlocking configuration (similar to enhancement framework 204 in FIG. 2). In some embodiments, the interlaced lattice structure arrangements may be utilized in an enhancement framework having a non-interlocking configuration (similar to an enhancement framework comprised of individual lattice elements 304 in FIG. 3). An embodiment may comprise a particular lattice arrangement based upon the required coefficient of friction and compressibility factor as dictated in the specification of the vehicle with which the brake pad assembly will be implemented.

Figure 5:
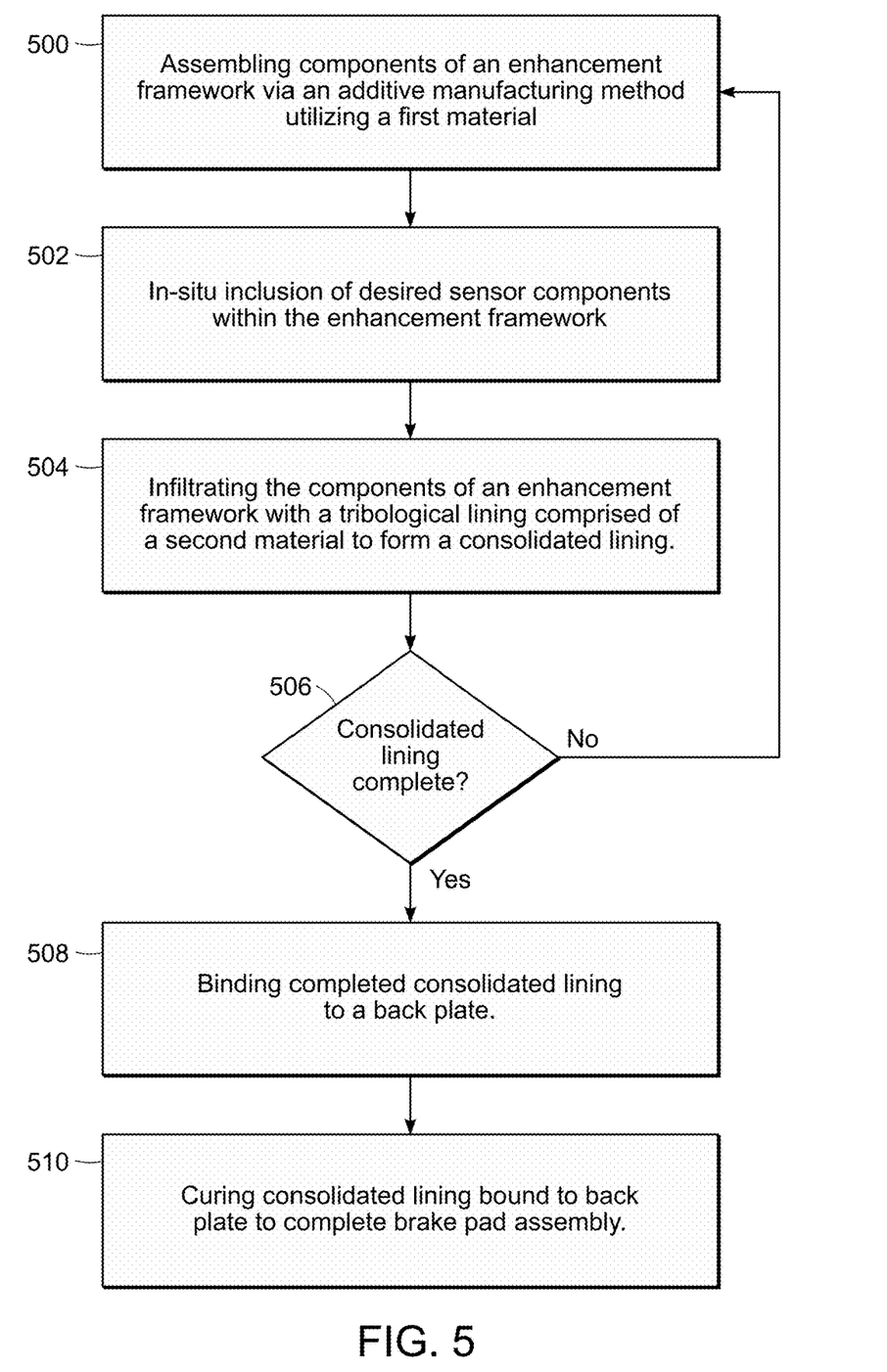
FIG. 5 is a flowchart illustrating one method of manufacturing a brake pad assembly according an embodiment of the teachings herein.

FIG. 5 depicts a flowchart providing the steps of a manufacturing process for manufacturing a brake pad assembly according to an embodiment of the disclosure herein. At step 500, assembly of an enhancement framework begins. The enhancement framework is assembled according to a design that incorporates a first material and particular arrangement to achieve a desired coefficient of friction and compressibility factor. The design is developed based upon requirements for the brake pad assembly based upon the specification of the vehicle for which the brake pad assembly will be implemented. The first material of the enhancement framework may comprise metals, metallic alloys, phenolic resin, friction modifiers, solid lubricants, fused polymers, ceramic particles, or any composite or combination of such constituent materials known to one of ordinary skill in the art. In the depicted embodiment, an aluminum alloy is utilized, but other embodiments may comprise other constituent materials for the enhancement framework. Development of the design may be accomplished using test implementation, modeling, or simulation prior to the manufacturing process. In some embodiments, step 500 may completely assemble the enhancement framework in totality. In other embodiments, such as embodiments utilizing additive manufacturing techniques, step 500 may be the first step in an iterative building process of the brake pad assembly.

After initial steps for the assembly of an enhancement framework in step 500, in-situ sensor components are included within the enhancement framework at step 502. In some iterative embodiments of the manufacturing process, the sensors may not be included in the arrangement until a predetermined number of iterations have been completed. In some embodiments, the sensors may be iteratively assembled substantially concurrently with the rest of the brake pad assembly components, and thus step 502 may be included as a step in an iterative manufacturing process. In the depicted embodiment, the brake pad assembly includes in-situ sensors, but some embodiments may be directed to the manufacture of a brake pad assembly without in-situ sensors. In embodiments directed to manufacture of a brake pad assembly without in-situ sensors, step 502 may be optional or omitted. Utilizing an iterative assembly process, such as additive manufacturing techniques, advantageously permits for maximal control of the in-situ arrangement of the sensors within the completed brake pad assembly.

At step 504, the enhancement framework components assembled during step 500 and the in-situ sensor components included in step 502 are infiltrated by a tribological lining of the brake pad assembly, the tribological lining being comprised of a second material. The infiltration process disperses the tribological lining across the assembled enhancement framework components. Thus, in step 504, the tribological lining may advantageously be dispersed in the form of a powder or fluid. For optimal dispersion during infiltration, the tribological lining may be of a homogenous-mixture consistency, such that the dispersion is even across the entire assembly. In some embodiments, the infiltration process may include a vibration sub-process, wherein the assembled components are subject to vibration during infiltration to optimally disperse the tribological lining evenly. The tribological lining may be fabricated using constituent materials such as binders, fillers, friction modifiers, solid lubricants, fused polymers, metals, metallic alloys, ceramic particles, phenolic resin or any composite combination of such constituent materials known to one of ordinary skill in the art. In the depicted embodiment, the tribological lining is comprised of a composite material of solid lubricants, binders, and phenolic resin, but other embodiments may comprise other constituent materials.

At step 506, a determination is made if all of the components of a consolidated lining of the brake pad (the enhancement framework, the tribological lining, and any sensors as desired) are in proper arrangement for the final form of the brake pad assembly. A non-iterative embodiment of the manufacturing method of FIG. 5 may include step 500 comprising assembly of enhancement framework in totality, step 502 comprising inclusion of all desired sensors, and step 504 comprising infiltration of the tribological lining in totality. For such non-iterative embodiments, step 506 will necessarily conclude that the consolidated lining is complete.

In embodiments wherein each of steps 500, 502, and 504 may comprise steps within an iterative process, step 506 comprises a determination if an appropriate number of iterations have transpired that the consolidated lining is completed. If it is determined that additional iterations are required to complete the consolidated lining, step 506 returns the manufacturing process to the next iteration of step 500. The consolidated lining is deemed to be complete when the dimensions of the consolidated lining meet the specified requirements of the brake pad assembly as dictated by the specification of the vehicle with which the brake pad assembly will be implemented. If at step 506 it is determined that the consolidated lining has been completely assembled, the process advances to step 508.

At step 508, the consolidated lining is bound to a base plate in a binding phase. The binding phase may comprise chemical adhesion, heat-activated adhesion, mechanical coupling, or other binding methods known to one of ordinary skill in the art. The optimal binding method will be dictated by the particular constituency of the enhancement framework and the tribological lining. In the depicted embodiment, the binding phase comprises a heat-activated binding activating binder material within the tribological lining, but other embodiments may comprise other binding methods. In the depicted embodiment, the base plate is made of steel, but other embodiments may comprise other constituent materials without deviating from the teachings of the disclosure herein.

After binding is completed, the manufacturing process advances to step 510 for a curing phase. In the depicted embodiment, the curing phase comprises a heating process, but other embodiments may comprise curing phases utilizing chemical curing, timed curing, or some combination of curing techniques to yield the desired coefficient of friction and compressibility factor of the brake pad assembly. The curing phase finalizes the form of the brake pad assembly, including providing surface preparation. In some embodiments, the curing phase may improve the structural integrity of the brake pad assembly. In some embodiments, the curing phase may be optional or omitted if the brake pad assembly meets the required specifications after the binding phase.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A brake pad assembly comprising:
   a base plate having a surface;
   a tribological lining extending from the surface of the base plate, the tribological lining comprising a substantially homogenous-mixture composite and having a first compressibility factor; and
   an enhancement framework disposed within the tribological lining, the enhancement framework having a geometrically-repeating arrangement in a plane substantially parallel to the surface of the base plate from which the lining extends, the geometrically-repeating arrangement comprised of a number of structures, the structures having a second compressibility factor and wherein the second compressibility factor matches the first compressibility factor within a specified threshold value.

2. The brake pad assembly of claim 1, wherein the structures comprise coil-shaped lattices.

3. The brake pad assembly of claim 1, wherein the specified threshold value is ±5%.

4. The brake pad assembly of claim 1, wherein the enhancement framework is a composite-material framework.

5. The brake pad assembly of claim 1, wherein the enhancement framework comprises structures in the form of an interlaced lattice.

6. The brake pad assembly of claim 5, wherein the interlaced lattice has a 3-dimensional structure.

7. The brake pad assembly of claim 1, wherein the structures are interlocking.

8. The brake pad assembly of claim 1, wherein the enhancement framework has substantially the same cross-sectional surface area at any plane within the extent of the tribological lining parallel to the surface of the baseplate from which the tribological lining extends.

9. A brake pad assembly comprising:
a base plate;
an enhancement framework extending from the base plate and having a number of interlaced lattice structures, the interlaced lattice structures having a first compressibility factor; and
a tribological lining comprised of a substantially homogenous-mixture composite, the tribological lining substantially infiltrating the enhancement framework and having a second compressibility factor that matches the first compressibility factor within a specified threshold value.

10. The brake pad assembly of claim 9, wherein the interlaced lattice structures of the enhancement framework are produced using an additive manufacturing technique.

11. The brake pad assembly of claim 9, further comprising a number of sensors disposed in-situ within the enhancement framework, the number of sensors having been manufactured concurrently with the enhancement framework.

12. The brake pad assembly of claim 11, wherein the number of sensors includes at least one of a wear sensor, a temperature sensor, a pressure sensor, or a vibration sensor.

13. A method of manufacturing a brake pad assembly, the method comprising:
assembling, using an additive manufacturing technique, an enhancement framework out of a first material, the enhancement framework having a geometrically-repeating arrangement which geometrically repeats across multiple dimensions;
infiltrating the enhancement framework with a tribological lining comprised of a second material to form a consolidated lining;
binding the consolidated lining to a backing plate; and
curing the consolidated lining bound to the backing plate Wherein the compressibility factor of the tribological lining and the compressibility factor of the enhancement framework are matched to within a specified threshold value.

14. The method of claim 13, wherein the additive manufacturing technique includes one of direct metal laser sintering, direct metal laser melting, selective laser sintering, selective laser melting, laser engineered net-shaping, electron beam melting, selective heat sintering, fused deposition modeling, or wire-arc additive manufacturing.

15. The method of claim 13, wherein the infiltrating the enhancement framework further comprises vibrating a enhancement framework such that the tribological lining is dispersed throughout the enhancement framework during infiltration.

16. The method of claim 13, wherein the infiltrating the enhancement framework further comprises an additive manufacturing technique utilizing the second material of the tribological lining.

17. The method of claim 16, wherein the additive manufacturing technique utilizing the second material is performed concurrently with the additive manufacturing technique utilizing the first material, the additive manufacturing technique utilizing the first material in a first feed-stock and the second material in a second feed-stock.

18. The method of claim 13, wherein the binding the consolidated lining to the backing plate comprises a hot-press operation.

19. The method of claim 13, wherein assembling an enhancement framework further comprises concurrently manufacturing of a sensor with the enhancement framework.

* * * * *